UNITED STATES PATENT OFFICE.

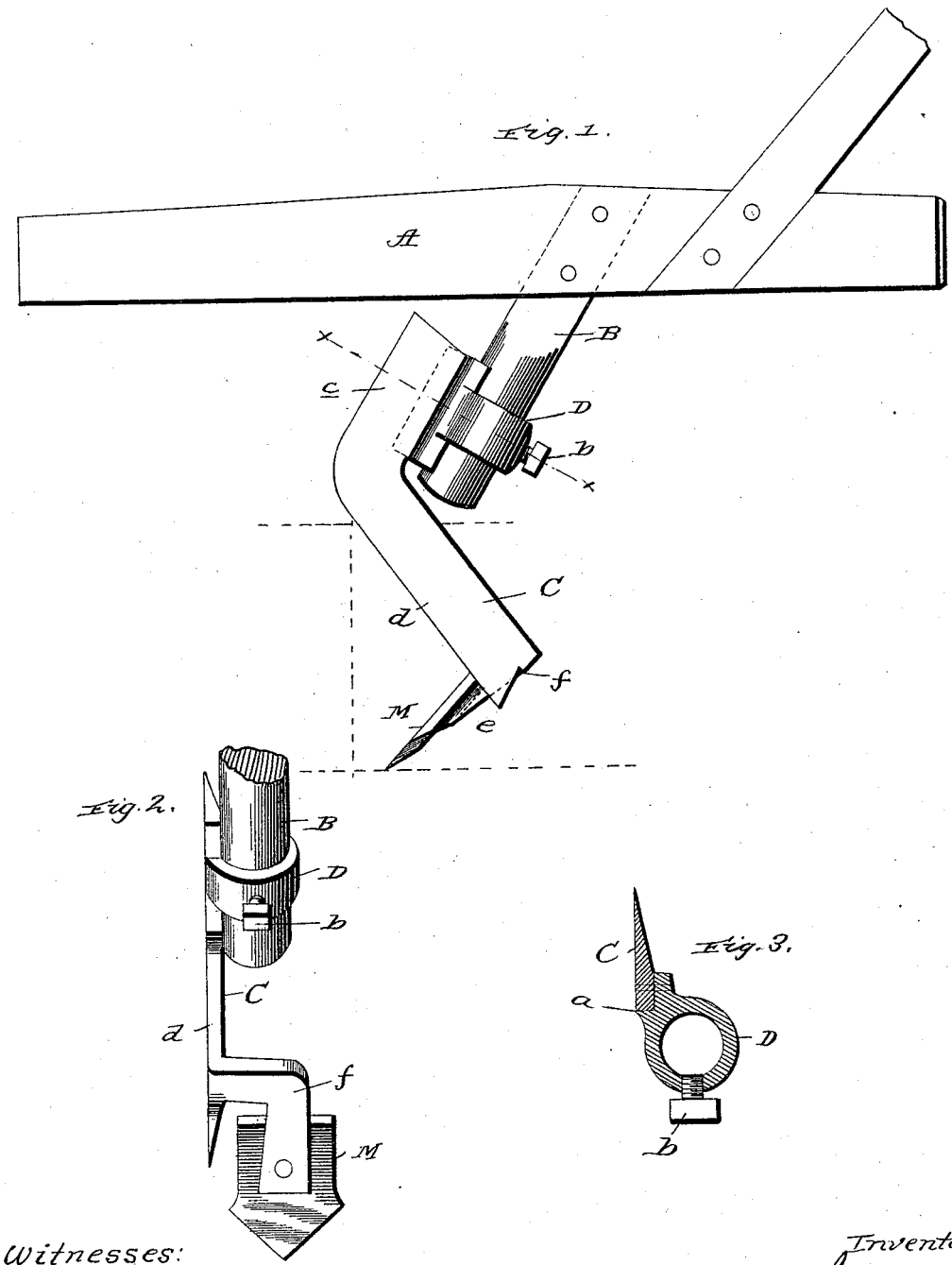

WILLIAM M. HEWITT, OF SHARPTOWN, INDIANA.

PLOW OR CULTIVATOR TOOTH.

SPECIFICATION forming part of Letters Patent No. 494,420, dated March 28, 1893.

Application filed October 12, 1892. Serial No. 448,673. (No model.)

*To all whom it may concern:*

Be it known that I, WILLIAM M. HEWITT, a citizen of the United States, residing at Sharptown, in the county of Franklin and State of Indiana, have invented certain new and useful Improvements in Plow or Cultivator-Teeth; and I do declare the following to be a full, clear, and exact description of the invention, such as will enable others skilled in the art to which it appertains to make and use the same.

My invention has relation to improvements in plow or cultivator teeth designed more especially for use on double corn plows, and it has for its general object to provide a tooth of such construction that the shovel or blade may be dragged through the earth without materially disturbing the surface thereof, whereby a near approach to the corn or other vegetation may be made to loosen the soil without covering the corn.

Other objects and advantages will appear from the following description and claims when taken in conjunction with the accompanying drawings in which:—

Figure 1, is a side elevation of a plow embodying my invention. Fig. 2, is a detail rear elevation illustrating the connection of the tooth to the plow shaft, and:—Fig. 3, is a transverse section taken in the plane indicated by the line $x, x$, of Fig. 1.

Referring by letter to the said drawings:— A, indicates the beam of a plow which may be of the ordinary or any approved construction; and B, indicates a hanger shaft which is suitably connected to the beam and is preferably pitched forwardly as shown.

C, indicates the cutter shank of my improved tooth, which is suitably connected to the collar or sleeve D, and is preferably seated in a shouldered recess $a$, formed in said collar or sleeve as better shown in Fig. 3, of the drawings. This collar or sleeve D, which is mounted upon the hanger shaft B, as shown, carries a set screw $b$, through the medium of which it is adjustably fixed upon said hanger shaft to regulate the cutting depth of the shovel or blade, presently to be described. The cutter shank C, which is beveled to afford the forward cutting edge, and is connected to the collar or sleeve D, as before stated, preferably has its upper portion $c$, pitched at an angle of inclination corresponding to that of the shaft B, and the said cutter shank preferably comprises the said upper portion $c$, the downwardly and rearwardly inclined intermediate portion $d$, and the lower portion $e$, which is pitched downwardly and forwardly and is provided with the angular bracket arm $f$, for the attachment of the shovel or blade M. By reason of the peculiar form of the cutter shank as just described, it will be perceived that the same will take through the earth at and adjacent to the surface thereof in advance of the shovel or blade and will cut the earth so as to facilitate the progress of said shovel or blade and prevent the same from breaking the earth under the corn and tearing the same out of the ground. By having a space between the shovel and the cutter shank, and having the said shank extended slightly rearward of the shovel, as shown, it will be seen that any roots or rubbish engaged by the shovel and shank will pass between the same and will be prevented from collecting and interfering with the functions of the shovel and shank.

The shovel or blade M, which is preferably flat and is pitched downwardly and forwardly, extends only upon one side of the cutter shank, as shown, whereby it will be seen that a very near approach to the corn or other vegetation may be made.

By the use of the construction described, it will be seen that while the earth below the surface will be greatly loosened yet the relative position of the particles will not be changed, and the surface soil will not be disturbed or moved so as to cover the corn.

Although I have in some respects specifically described the construction and relative arrangement of the parts of my improved plow or cultivator tooth, I do not desire to be confined to the same as such changes or modifications may be made as fairly fall within the scope of my invention.

Having described my invention, what I claim is—

1. In a plow or cultivator tooth, substantially as described, the combination with a shank having a forward cutting edge, and an angular bracket arm connected to the shank; of a shovel connected to the bracket arm and resting laterally with respect to the shank; the said shovel being set away from the shank so as to afford a space between the two, as and for the purpose set forth.

2. In a plow or cultivator tooth, substantially as described, the combination with a shovel; of a shank resting at one side of the shovel and disposed at right angles to the same and having a forward cutting edge; the said shank being inclined forwardly and upwardly from the shovel so as to take through the earth in advance of the shovel, substantially as and for the purpose specified.

3. In a plow or cultivator tooth, substantially as described, the combination with the shank, having the forward cutting edge, and comprising the upper, upwardly and rearwardly inclined portion $c$, the intermediate, downwardly and rearwardly inclined portion $d$, and the lower, downwardly and forwardly inclined portion $e$, of the shovel or blade carried by said shank, substantially as specified.

In testimony whereof I affix my signature in presence of two witnesses.

WILLIAM M. HEWITT.

Witnesses:
HENRY GREATBATCH,
JOHN X. RHYMER.